United States Patent [19]
de Graffenried

[11] Patent Number: 5,581,415
[45] Date of Patent: Dec. 3, 1996

[54] DEVICE FOR INSERTING OPTICAL AND MECHANICAL COMPONENTS INTO A MOUNTING SLEEVE

[75] Inventor: Christian de Graffenried, La Tour-de-Peilz, Switzerland

[73] Assignee: Leica AG, Heerbrugg, Switzerland

[21] Appl. No.: 493,573

[22] Filed: Jun. 22, 1995

[30] Foreign Application Priority Data

Jun. 28, 1994 [DE] Germany ................... 4422170.3

[51] Int. Cl.$^6$ ................................................. C02B 7/02
[52] U.S. Cl. ..................... 359/819; 359/811; 359/827; 359/808
[58] Field of Search ....................... 359/809, 808, 359/819, 820, 811, 821, 822, 827; 354/286

[56] References Cited

U.S. PATENT DOCUMENTS

| | | | |
|---|---|---|---|
| 2,388,077 | 10/1945 | Reardon | 359/808 |
| 2,683,397 | 7/1954 | Loeck | 359/819 |
| 2,905,054 | 9/1959 | Logan | 359/819 |
| 3,016,798 | 1/1962 | Lawrence | 359/819 |
| 4,291,944 | 9/1981 | Nomura | 359/827 |
| 4,303,306 | 12/1981 | Ookawa | 359/819 |
| 5,161,061 | 11/1992 | Ihara | 359/708 |
| 5,274,456 | 12/1993 | Izumi | 348/335 |
| 5,309,541 | 5/1994 | Flint | 385/133 |
| 5,339,193 | 8/1994 | Korpert | 359/819 |
| 5,353,166 | 10/1994 | Hanford | 359/819 |
| 5,396,487 | 3/1995 | Abe | 359/819 |
| 5,446,591 | 8/1995 | Medlock | 359/666 |
| 5,493,452 | 2/1996 | Hoshino | 359/819 |

FOREIGN PATENT DOCUMENTS

| | | | |
|---|---|---|---|
| 2061661 | 6/1972 | Germany . | |
| 59-195206 | 11/1984 | Japan . | |
| 195206 | 11/1984 | Japan | 359/808 |
| 125307 | 6/1987 | Japan | 359/808 |
| 125306 | 6/1987 | Japan | 359/808 |
| 123008 | 5/1988 | Japan | 359/808 |

OTHER PUBLICATIONS

Crist, R. W. and Rippstein, R. P., Pre-Aligned Lens Mounting Assembly, Jan. 1980, pp. 3088–3089, vol. 22, No. 8A.

*Primary Examiner*—Georgia Y. Epps
*Assistant Examiner*—Ricky Mack
*Attorney, Agent, or Firm*—Foley & Lardner

[57] ABSTRACT

The invention relates to a device for inserting optical and mechanical components into mounting sleeves. The components are introduced upward from below into the mounting sleeve through a lead-through opening having movable locking elements. Although the locking elements allow the insertion of the components, they prevent the locking elements from leaving the mounting sleeve. The mounting sleeve is thus successively filled with insert parts. This type of insertion to a large extent counteracts the generation of dirt particles, in particular between the insert parts, and is outstandingly suitable for automation.

20 Claims, 4 Drawing Sheets

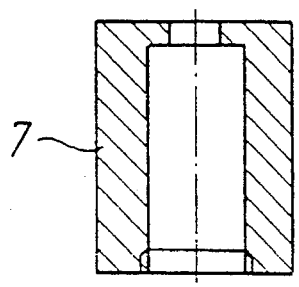
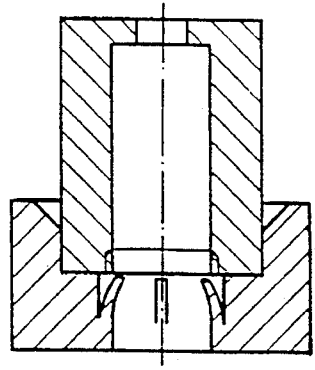
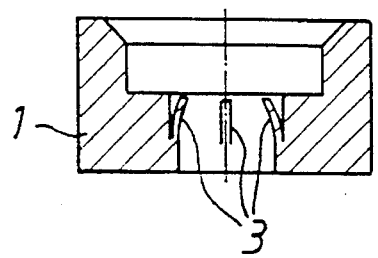
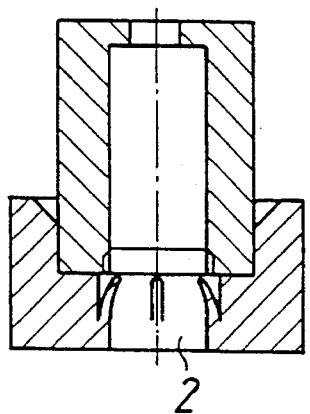
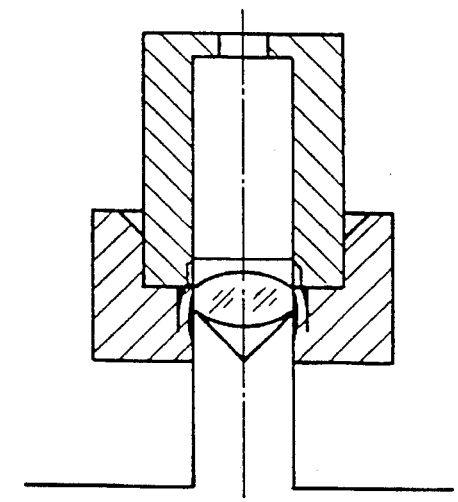
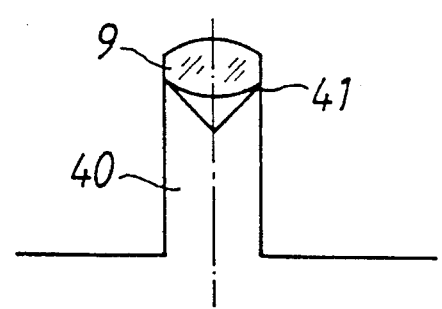

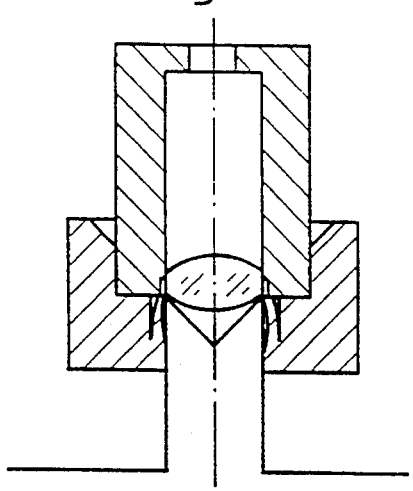
Fig.5e
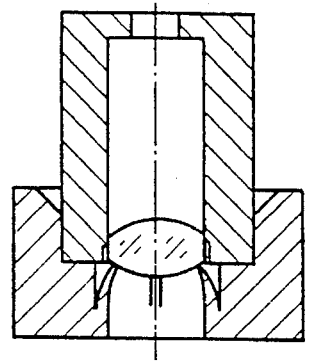
Fig.5f
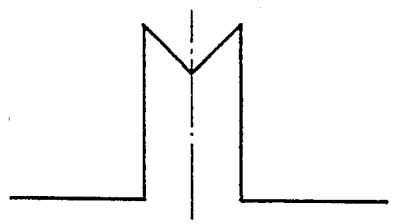
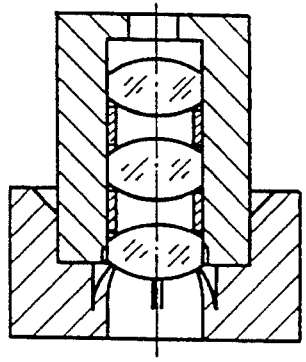
Fig.5g
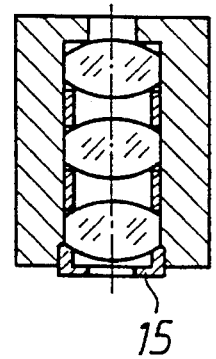
Fig.5h
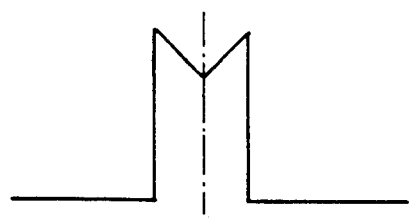

DEVICE FOR INSERTING OPTICAL AND MECHANICAL COMPONENTS INTO A MOUNTING SLEEVE

BACKGROUND OF THE INVENTION

The invention relates to a device for inserting optical components and their mechanical holding and/or securing parts into a mounting sleeve.

In the following text, the expression "lens system" is intended to be understood as a group of lenses connected to one another. Often, the lenses of a group are cemented and mounted one under another, so-called mounted cemented elements. The expression "insert parts" is intended to be understood as both optical components, such as lens systems, lenses, diaphragms, filters of all types, and also mechanical components such as spacing, holding and securing parts, which can be inserted into mounting sleeves.

In JP 59-195 206 A, a mounting sleeve is described into which optical components and mechanical distance parts can be inserted. The mounting sleeve has at its filling opening a special closure device which consists of resilient latches. A lens which is inserted last has a larger diameter than the diameter of the circle on which the latches are located. During the guiding through of this lens, the latches bend up until the lens can lock in. The latches hold this lens and thus at the same time all the previously inserted components in the mounting sleeve.

The German patent specification 2 061 661 discloses how mounting sleeves or the lens mountings mentioned there can be provided on the inner wall with lens rests for holding lenses or lens systems. These lens rests are protuberances which are produced by the non-machining introduction of grooves into the lens mount and which orient and hold the lenses or lens systems.

Such lens mounts are filled by hand, the lenses and other insert parts being inserted from above individually into the mount. The lens rests in this case serve at the same time for the removal of air. This is because in conventional mounting sleeves in which there are no lens rests an air cushion is produced between a lens already located in the mount and the lens about to be inserted. This air cushion remains because of the exact fitting of the lenses to the inner diameter of the mounting sleeve. The lens to be inserted can thus not reach its envisaged place without compressing the air cushion. For this reason, at least one longitudinal groove must be cut into the inner wall of the mounting sleeve, the longitudinal groove ensuring the necessary removal of air.

A larger problem exists in the fact that dust and dirt particles, which are also inevitably present between the lenses after filling, get into the mounting sleeves, which are open at the top.

Dust and dirt particles are present in various sizes and concentrations in the air in any room. They are produced by the rubbing off of surfaces, by clothing and by human beings themselves. The fact that a human being represents one of the main particle sources is verified, for example, by the closed clothing, similar to spacesuits, which personnel in semiconductor production must wear because of the dust-sensitive production processes. The semiconductor industry is also the origin of the subdivision of dust particles into clean room classes which differ from one another in terms of particle diameter and number of particles per unit volume.

These particles in the air have the known tendency on average in time to follow the gravitational pull of the earth and to move downward. As a result, the number of particles on the upper side of a surface kept in the room increases in a short time, while this applies significantly less for the underside of the surface. Very many of these particles are microscopically small, that is to say, they are only visible under the microscope.

Hence, a mounting sleeve which is open at the top catches light dust and dirt particles which also get between individual lenses during the filling. The quality of the optics and in particular of high power optics such as are also used in the semiconductor industry, is affected detrimentally as a result. The particles reduce the light intensity, cause an inhomogeneous intensity distribution and are even visible at certain locations.

A possible alternative to the filling from the top into the mounting sleeve is stacking the lenses to be inserted and other optical and mechanical components initially one on another, in order then to put the inverted mounting sleeve itself over them. In the process, it often happens that this stack of insert parts tips over. This method is therefore time-consuming and inconvenient. It is little suited for rapid, simple and reliable handling for filling mounting sleeves.

SUMMARY OF THE INVENTION

It is therefore an object of the invention to produce a device for the filling of mounting sleeves which avoids air cushions and the entry of dust particles in a simple way and which furthermore makes possible automation which inserts the insert parts into the mounting sleeve without jamming.

This object is achieved by a device for inserting parts into a mounting sleeve, comprising a base body detachably connectable to the mounting sleeve, the base body having a lead-through opening with a diameter which is substantially equal to an inner diameter of the mounting sleeve and coaxial thereto; locking elements disposed in the lead-through opening and attached at first ends to an inner wall of the base body, free ends of the locking elements being located closer to the mounting sleeve than the first ends; and cutouts formed in the inner wall, adjacent the locking elements and extending essentially parallel to the axis of symmetry of the lead-through opening.

In one embodiment, the locking elements comprise resilient rods and the first ends are fixedly connected to the inner wall, whereby the resilient rods are deflected into the cutouts by insert parts when the insert parts pass through the lead-through opening and, after the insert parts have passed, the resilient rods spring back into an original locking position.

In another embodiment, the locking elements comprise lever parts and the first ends are pivotably supported at the inner wall, whereby the lever parts are pivoted into the cutouts by insert parts when the insert parts pass through the lead-through opening and, after the insert parts have passed, the lever parts are returned into an original locking position by an external force.

Preferably, the base body includes a lateral stop and a longitudinal stop to receive the mounting sleeve, and the stops are located at an end of the base body adjacent the mounting sleeve and are coaxial with the inner wall of the base body.

Advantageously, the mounting sleeve and the base body are disposed vertically.

Preferably, the resilient rods extend aligned with the inner wall and have at the free ends hook-like extensions directed into the lead-through opening wherein parts of the extensions which face the mounting sleeve are flattened off.

In yet another embodiment, the inner wall of the base body is formed of at least three radially displaceable and fixable jaws which are each provided with at least one of a resilient rod and a lever part.

Advantageously, the insertion device further comprises a holding device which is controllably displaceable relative to the lead-through opening, for the reception, transport and discharge of parts.

Another aspect of the invention is a method for inserting parts into a mounting sleeve comprising detachably connecting a base body to the mounting sleeve; inserting a part into a lead-through opening formed in the underside of the base body; biasing locking elements in the base body away from the lead-through opening by passing the part through the base body and against the locking elements; and returning the locking elements to an original position.

Preferably, the method further comprises the steps of detaching the base body from the mounting sleeve and closing the mounting sleeve.

In one aspect of the method, the step of inserting includes inserting a part using a holding device.

Advantageously, the step of biasing includes biasing the locking elements into cutouts formed in an inner wall of the base body.

Further objects, features and advantages of the invention will become apparent from the following detailed description taken in conjunction with the accompanying drawing.

BRIEF DESCRIPTION OF THE DRAWINGS

The drawing is hereby expressly made a part of the specification.

FIG. 4 shows an insertion device having an inner wall which can be displaced by means of jaws and FIGS. 5a–5h show an insertion sequence.

DETAILED DESCRIPTION OF THE PREFERRED EMBODIMENTS

Figure 1:
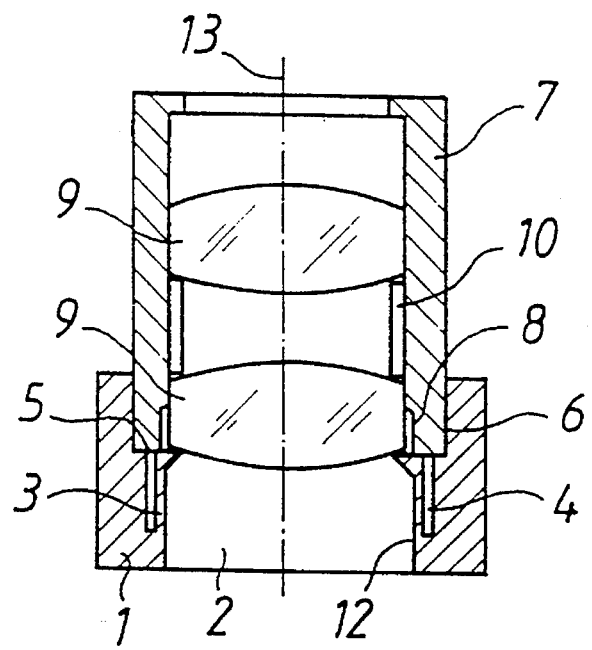
FIG. 1 shows a base body having resilient locking elements and a mounting sleeve located on the stop.

The invention is directed toward the fact that, differing from conventional hand filling, the filling opening of the mounting sleeve points downward. The insert parts are inserted individually one after another upward from below into the mounting sleeve. In this arrangement, the locking elements in the base body and a holding device corresponding to the insert parts help significantly.

The holding device, which can also be designated as a support, may comprise, for example, a metal cylinder whose diameter is somewhat smaller than that of the insert part. The end face of the cylinder, which points upward, can have a knife edge. The insert part lies centered on this knife edge.

The holding device also has the task of holding the insert part. At the same time it also serves as transport means which receives the insert part from a range of insert parts, transports it to the inserting device and delivers it there to the mounting sleeve.

The mounting sleeve, during filling, is detachably connected to the base body. It is seated on a stop surface on the base body and is centered with respect to the lead-through opening of the base body.

Fitted on the inner wall of the lead-through opening of the base body are movable locking elements which reach with their ends into the entry region of the mounting sleeve. The movable locking elements are constructed such that they have the effect of a fish trap, that is to say, although they allow an incoming insert part to pass, so that it can pass into the mounting sleeve, they subsequently retain it there. The retaining occurs as a result of the fact that the movable locking elements, after the passing through of the insert part, move back toward the holding device and then themselves take over the holding function for the insert part. The insert part is now located in the entry region of the mounting sleeve and the holding device is once more free for loading a further insert part. During the repetition of the transport and insertion process, the next insert part is inserted into the mounting sleeve and, in so doing, pushes the insert parts already located in the mounting sleeve further into the mounting sleeve. In this manner, the mounting sleeve is successively filled upward from below with insert parts. The last insert part is most often a closure screw which is screwed into a thread in the mounting sleeve.

A decisive advantage of the insertion device described and of the insertion procedure achieved thereby consists of the fact that the problem of dust particle entry is solved, in particular also that of particles which become detached from the inner wall of the mounting sleeve. The filling opening of the mounting sleeve points downward during filling. This is unconventional. To a large extent it prevents dirt and dust particles from the ambient air getting into the mounting sleeve and between the insert parts.

In the event that, during the insertion, tilting of the insert part or contacting of the edge of the filling opening should occur, the particles rubbed off from the insert part and the mounting sleeve would fall downward. They therefore do not fall into the mounting sleeve, as is necessarily the case in the case of conventional filling from above.

However, the insertion device functions so well that tilting does not occur at all. This allows the inner diameter of the mounting sleeve and the outer diameter of the insert parts provided therefor to be matched to one another with very close tolerances. As a result, the insert parts can easily be displaced within the mounting sleeve without jamming and, in the process, generate considerably fewer wear particles from themselves and the inner wall. The production of wear particles by insert parts which are already located in the mounting sleeve is thus reduced in a decisive way.

As a result of these outlined effects, the dirt particle entry into the built-up optical system is reduced a considerable extent, as comparative investigations have shown.

A further advantage of the invention results from the fact that no deaeration grooves have to be cut in the mounting sleeves or none of the protuberances described at the outset must be produced as lens rests. Since, as already mentioned, the inner diameter of the mounting sleeve and the outer diameter of the insert parts are matched to one another with very close tolerances, tilting is not possible and the insert parts can easily be displaced within the mounting sleeve. Thus, a specific distance between the insert parts remains unaltered as soon as they are located in the mounting sleeve. During further filling, all the already inserted components are displaced together as a block. The volume of each air cushion between two insert parts, for example between two lenses, is thus fixed. Hence, a deaeration device is no longer necessary and corresponding operating devices and handling processes can be omitted.

Any thoughts that the air cushions could not expand during heating and as a result could exert a pressure on the insert parts are unfounded, since an alteration of the ambient temperature, just like an alteration of the external air pressure, takes place only very slowly. There, is therefore sufficient time available for pressure equalization between the air cushions, even in the case of very closely toleranced fitting of the insert parts into the mounting sleeve.

There are various possibilities for implementing the moving locking elements in the lead-through opening of the base body. In one type of implementation, the locking elements comprise resilient rods which run aligned toward the inner wall or in a parabolic shape out of the inner wall of the lead-through opening in the direction of the mounting sleeve. Their feet are firmly connected to the inner wall of the base body. The resilient rods can be produced with the base body by means of a casting process or by machining from a single piece. Cutouts, in which the resilient parts of the locking elements can be pressed during the leading through of the insert parts, are inserted into the inner wall.

The sprung ends of the locking elements can be designed as hook-shaped extensions which project into the lead-through opening. They support the fish-trap-like mechanism. Thus, during the leading through of the insert part, the locking elements initially bend up somewhat, and are as a result pressed into the cutouts of the inner wall of the lead-through opening. The locking elements spring back as soon as the insert part has passed by the hook-shaped extensions. By pulling back the holding device, the insert part comes to rest on the hook-shaped extensions and is therefore located in the mounting sleeve.

Various materials can be considered for such a base body having resilient locking elements. In particular, there are plastics which are wear-resistant, which enable easy sliding through of the insert parts and which, given suitable dimensioning, have an appropriate resilient force effect for the locking elements. Of course, such an insertion device made of one piece is only intended for a fixedly prescribed diameter of the insert parts and the mounting sleeve linked therewith. Insert parts and mounting sleeves of other sizes need in each case a dedicated insertion device specifically produced for their size.

This restriction can be removed with the selection of another but more complicated construction of the insertion device. If the locking elements are fitted to individual jaws which are displaceable and fixable in the radial direction in the base body, the diameter of the lead-through opening can be variably adjusted. It can thus be matched to different diameters of insert parts. In order that different mounting sleeves having an inner diameter on the base body corresponding to the insert parts can also be received, it is favorable to fit the detachable receptacle for the mounting sleeves directly to the jaws. In the simplest case it can be designed as a receiving cam. The receiving cams of all the jaws work together as a clamp for the mounting sleeve.

Although the outlined construction of a variable lead-through opening is more costly, it opens the possibility that insert parts having different cross sections or diameters can be used. At least within a certain size range of mounting sleeves and insert parts, a single insertion device of this type is sufficient and the changing of the insertion device is dispensed with.

If the locking elements are not designed resiliently but rigidly as lever parts, their feet must be supported pivotally in the inner wall of the lead-through opening, in order to ensure the outlined fish-trap-like mechanism. In this arrangement, the lever parts can be configured such that, after the leading through of an insert part, they move toward one another because of their inherent weight or via an additional spring force, so that the insert part can rest upon them. If only the inherent weight of the locking elements is used, it is imperative that the axis of the lead-through opening extends vertically and also that the mounting sleeve is placed vertically on the base body.

However, the lever parts can also be articulated on actuating elements which lead to the outside from the base body. The actuating elements can be actuated manually or electromechanically in such a way that the lever parts release or lock the lead-through opening for the insert parts.

It is common to all the named types of implementation that they are suitable in a special way for an automated sequence for the filling of mounting sleeves. The holding device can in this case be a part of a robot arm or it is moved in three-dimensional space with the aid of a robot gripper or with a motorized x-y-z table. The insert parts in this type are fetched from a supply store and inserted into the mounting sleeves via the insertion device according to the invention. All these devices can be located in a common clean room which is sealed and protected against contamination.

In the case of very rapid movements of the robot there is the risk that the insert parts will lose their stable position on the holding device during the transport from the supply store to the mounting sleeve and, in certain circumstances, fall from the holding device. If the inherent weight is not sufficient, the contact pressure on the knife edge of the holding device can be increased by means of underpressure in the holding device, at least for flat, closed insert parts such as lenses or filters. These insert parks are thus additionally pressed against the holding device by suction and the robot can move more rapidly with them. For other insert parts such as holding rings or diaphragms, the robot gripper needs additional holding devices, if appropriate, which lend lateral support to the insert parts during transport.

FIG. 1 shows, in a sectional plane having the axis 13, a rotational-symmetrical embodiment of the insertion device in which a base body 1 and resilient rod 3 as locking elements are produced from one piece. A mounting sleeve 7 is located with its filling opening at the bottom on a longitudinal stop 5 on the base body 1. Mounting sleeve 7 and base body 1 form a detachable plug and socket connection by means of the lateral stop 6. Two lenses 9 and a spacer element 10 are located in the mounting sleeve 7. In the vicinity of the filling opening, the mounting sleeve 7 has an internal thread 8.

The base body 1 has a lead-through opening 2 which is matched to the inner diameter of the mounting sleeve 7 and is coaxial thereto. The insert parts 9, 10 can be introduced through the lead-through opening 2 of the base body 1 into the mounting sleeve 7. In the lead-through opening 2, the resilient rods 3 are connected in a fixed manner at one end to the inner wall 12 of the base body 1, the free end of the resilient rods 3 being located closer to the mounting sleeve than the fixed end.

The resilient locking elements 3 barely reach the level of the longitudinal stop 5, so that they can be pressed into the cutouts 4 of the inner wall 12 of the base body 1 without contacting the mounting sleeve 7. The cutouts 4 extend essentially parallel to the axis of symmetry of the lead-through opening 2. The resilient rods 3 can be deflected by the insert parts 9, 10 when they are passing the lead-through opening 2 into the cutouts 4 only in the direction of the mounting sleeve 7 and, after the insert parts 9, 10 have passed, spring back again into the original locking position. Hook-shaped extensions 11 of the resilient locking elements 3 support the insert parts 9, 10 and hence prevent the insert parts 9, 10 sliding out of the mounting sleeve 7 again because of their inherent weight.

In the predominant cases, cylinder-symmetrical shapes for the mounting sleeve 7 and thus also for the associated lead-through opening 2 in the base body 1 are used. Only such shapes are shown in the figures although other shapes are within the scope of the invention. The connection of mounting sleeve 7 and base body 1 in this case is carried out such that their axes of symmetry 13 coincide and they are consequently and because of their cylindrical symmetry arranged coaxially with respect to each other. In the case of any use of other cross sections, the expression "coaxial" is to be understood here and in the claims in a broadened sense. Cylindrical lenses, for example, generally have a rectangular cross section, as a result of which the cross section of the mounting sleeve 7 and the lead-through opening 2 of the base body 1 must also be rectangular. During their assembly, mounting sleeve 7 and base body 1 are intended to be aligned to each other in terms of shape and their axes of symmetry are intended to be brought into coincidence. Only in this way is it possible to insert the mechanical and optical components into the mounting sleeve 7.

Figure 2:
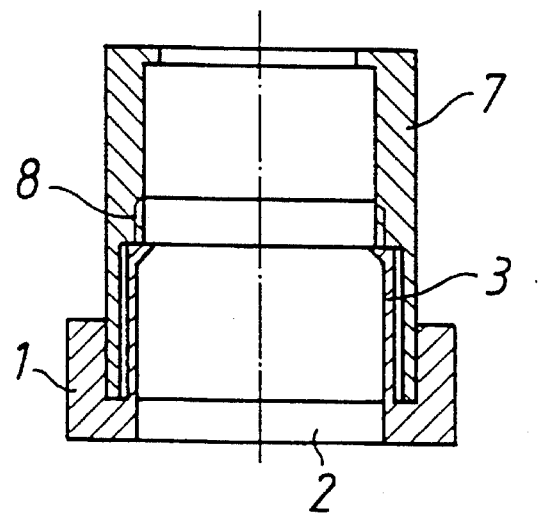
FIG. 2 shows a base body having longer resilient locking elements which reach into the mounting sleeve.

In FIG. 2, the resilient locking elements 3 are implemented in a longer shape. They project far upward into the mounting sleeve 7. The internal thread 8 is located at a central level, since this mounting sleeve 7 is intended to be filled only halfway with insert parts.

Figure 3:
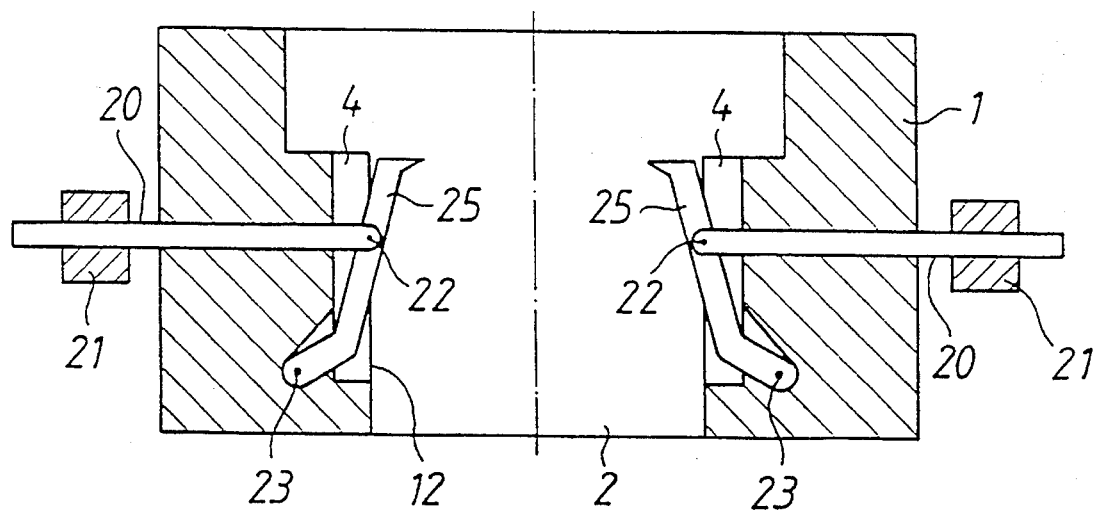
FIG. 3 shows a base body having locking elements which are designed as lever parts.

In FIG. 3, lever parts 25 are provided as locking elements, which are supported individually and pivotally about an axis 23. The lever parts 25 are connected via a further axis 22 to actuating elements 20 which lead out of the base body 1. The actuating elements 20 can drive the lever parts 25 in such a way that these release or lock the lead-through opening 2 for the insert parts. If the displacement of the lever parts 25 is carried out manually via the actuating elements 20, the device 21 is then designed as a locking device and can be a clamp in the simplest case.

In the case of electromechanical displacement of the lever parts 25, the device 21 is equipped with an electric motor and possibly with a gearbox. In this way, electrical control of the actuating elements 20 and of the lever parts 25 is possible.

As a further variant, the lever parts 25 are driven using a spring, for example a coil or leaf spring. Here, the constructions of actuating elements 20, device 21 and axis 22 in FIG. 3 can be omitted.

There is also the possibility that the lever parts 25 fall in the direction of the lead-through opening 2, which is thereby locked, because of their inherent weight, that is to say more accurately because of their torque. The lever shape of the lever parts 25 in this arrangement results in a sufficiently large torque. The utilization of gravity, however, necessitates a good vertical alignment of the axis of the lead-through opening 2.

Figure 4:
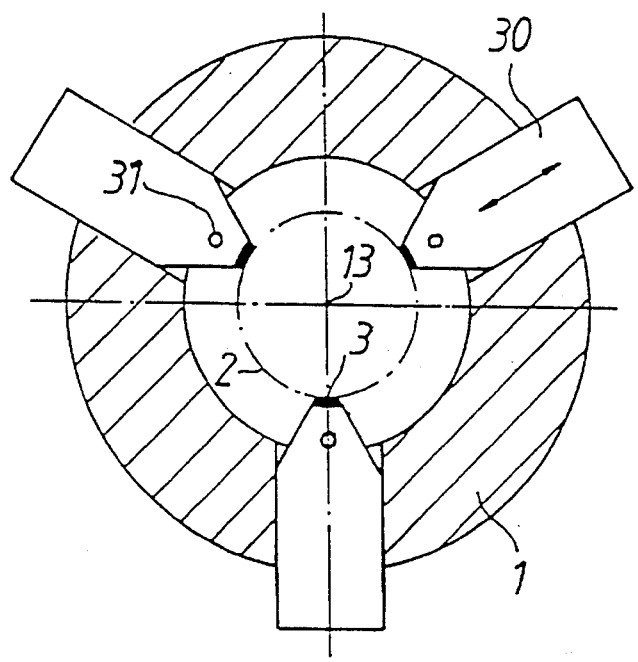

FIG. 4 shows, in top view, a displaceable insertion device for various diameters of mounting sleeves 7 and associated insert parts. Fitted in the base body 1 are preferably three jaws 30 which can be displaced radially and symmetrically with respect to the axis 13. These jaws 30 form the effective inner wall of the base body 1. The receiving cams 31 serve as the lateral stop for the mounting sleeves 7. The mounting sleeves 7 are clamped by the receiving cams 31 and are thus detachably connected to the base body.

The jaws 30 now form the variable lead-through opening 2 with the locking elements 3. In the lower part of the lead-through opening 2, the insert parts are guided and then slide past the locking elements 3, which hold them after they have been completely led through. The movable locking elements 3 are in this case implemented according to one of the types described above.

The jaws 30 can be set under manual control, electromagnetic control or electronic control. They are variable in the radial direction so that they can be used within a specific range for any desired mounting sleeve diameter.

FIG. 5 shows an insertion sequence. The individual stages of insertion are described below following the sequence. In FIG. 5a, the mounting sleeve 7 is brought, with its filling opening at the bottom, into the receptacle provided for it in the base body 1. In FIG. 5b, mounting sleeve 7 and base body 1 are connected. In FIG. 5c, a lens 9 is brought into the lead-through opening 2 of the base body 1 from the bottom on the knife edge 41 of the holding device or robot arm 40. In FIG. 5d, the lens 9 is led through the lead-through opening 2 and, as a result of the force acting via the holding device 40, presses the resilient locking elements 3 so far up that it can slide through. After the complete leading through of the lens 9 through the locking elements 3 in FIG. 5e, the diameter of the locking elements 3 is reduced to the diameter of the holding device 40. The locking elements 3 thus block the path of the lens 9 out of the mounting sleeve 7 and, according to FIG. 5f, the holding device 40 is then once more free for loading a further insert part. This procedure is repeated in the manner outlined, a further insert part pushing the insert parts already located in the mounting sleeve upward during each insertion. In FIG. 5g, the mounting sleeve 7 has been completely filled. The introduction of the insert parts 9, 10 into the mounting sleeve 7 may be carried out automatically, the holding device 40 being guided by a robot arm or being itself part of a robot arm.

The mounting sleeve 7 is subsequently closed with a closure 15 which pushes the insert parts in the mounting sleeve 7 upward until the lens 9 which was inserted first contacts the other end of the mounting sleeve 7. The entry opening for the optics is located at this point in the mounting sleeve 7.

The closure 15 can now be pressed into the mounting sleeve 7 or bonded to it or cemented to it. However, in most cases a screw closure 15 is used. Therefore, in the mounting sleeve 7 shown, an internal thread 8 for such a screw closure 15 is cut in the region of the filling opening. With the aid of a holding device 40 prepared for the screw closure 15, the closure ring is screwed in. Here, the holding device 40 is rotated with respect to the stationary mounting sleeve 7, since most robots have a rotational degree of freedom integrated in the gripper. Of course, it is also possible to rotate the mounting sleeve 7 with the base body 1 with respect to the stationary holding device 40.

As a simpler, less costly procedure during the closure of the mounting sleeve 7, it is also possible to invert the mounting sleeve 7 with the insert parts before the fitting of the closure 15. As a result, the mounting sleeve 7 can be closed from above with the closure 15.

While the invention has been described with reference to certain preferred embodiments, numerous changes, alterations and modifications to the preferred embodiments are possible without departing from the spirit and scope of the invention, as defined in the appended claims and equivalents thereof.

What is claimed is:

1. A device for inserting parts into a mounting sleeve, comprising:

a base body detachably connectable to the mounting sleeve, the base body having a lead-through opening with a diameter which is substantially equal to an inner diameter of the mounting sleeve and coaxial thereto;

locking elements disposed in the lead-through opening and attached at first ends to an inner wall of the base body, free ends of the locking elements being located closer to the mounting sleeve than the first ends; and cutouts formed in the inner wall, adjacent the locking elements and extending essentially parallel to the axis of symmetry of the lead-through opening.

2. The device of claim 1, wherein the locking elements comprise resilient rods and the first ends are fixedly connected to the inner wall, whereby the resilient rods are deflected into the cutouts by insert parts when the insert parts pass through the lead-through opening and, after the insert parts have passed, the resilient rods spring back into an original locking position.

3. The device of claim 1, wherein the locking elements comprise lever parts and the first ends are pivotably supported at the inner wall, whereby the lever parts are pivoted into the cutouts by insert parts when the insert parts pass through the lead-through opening and, after the insert parts have passed, the lever parts are returned into an original locking position by an external force.

4. An insertion device as claimed in claim 2, wherein the base body includes a lateral stop and a longitudinal stop to receive the mounting sleeve and wherein the stops are located at an end of the base body adjacent the mounting sleeve and are coaxial with the inner wall of the base body.

5. An insertion device as claimed in claim 3, wherein the base body includes a lateral stop and a longitudinal stop to receive the mounting sleeve and wherein the stops are located at an end of the base body adjacent the mounting sleeve and are coaxial with the inner wall of the base body.

6. The insertion device as claimed in claim 1, wherein the mounting sleeve and the base body are disposed vertically.

7. The insertion device as claimed in claim 2, wherein the resilient rods run out of the inner wall in a parabolic shape.

8. The insertion device as claimed in claim 2, wherein the resilient rods extend aligned with the inner wall and have at the free ends hook-like extensions directed into the lead-through opening wherein parts of the extensions which face the mounting sleeve are flattened off.

9. The insertion device as claimed in claim 3, wherein the free ends of the lever parts are inserted into the cutouts such that, when the mounting sleeve is vertically arranged, the lever parts fall into the lead-through opening under the influence of gravity.

10. The insertion device as claimed in claim 3, further comprising actuating elements which lead out of the base body and are articulated onto the lever parts such that the lever parts are driveable to release or to lock the lead-through opening.

11. The insertion device as claimed in claim 1, wherein the inner wall of the base body is formed of at least three radially displaceable and fixable jaws which are each provided with at least one of a resilient rod and a lever part.

12. The insertion device as claimed in 1, further comprising a holding device which is controllably displaceable relative to the lead-through opening, for the reception, transport and discharge of parts.

13. The insertion device as claimed in claim 12, wherein the holding device includes a knife-shaped rest for the parts.

14. The insertion device as claimed in claim 12, wherein the holding device is part of a robot arm.

15. A method for inserting parts into a mounting sleeve comprising:

detachably connecting a base body to the mounting sleeve;

inserting a part into a lead-through opening formed in the underside of the base body;

biasing locking elements in the base body away from the lead-through opening by passing the part through the base body and against the locking elements; and returning the locking elements to an original position.

16. The method of claim 15, further comprising the steps of detaching the base body from the mounting sleeve and closing the mounting sleeve.

17. The method of claim 15, wherein the step of inserting includes inserting a part using a holding device.

18. The method of claim 15, wherein the step of biasing includes biasing the locking elements into cutouts formed in an inner wall of the base body.

19. The method of claim 15, wherein the step of returning includes returning the locking elements using resilient force of the locking elements.

20. The method of claim 15, wherein the step of returning includes returning the locking elements using an external force.

* * * * *